Patent Office
3,761,469
Patented Sept. 25, 1973

3,761,469
PROCESS FOR THE MANUFACTURE OF STEROID CHLOROHYDRINS
Percy Lavon Julian and Arnold Lippert Hirsch, Oak Park, Ill., assignors to Ciba-Geigy AG, Basel, Switzerland
No Drawing. Filed May 15, 1972, Ser. No. 253,071
Int. Cl. C07c *169/16, 169/30*
U.S. Cl. 260—239.55 A                    7 Claims

ABSTRACT OF THE DISCLOSURE

The present invention concerns a new process for the manufacture of 6β,5α-steroid chlorohydrins by treating 5α,6β-dihydroxy-steroids with an aliphatic or aromatic sulfonic acid chloride at 30–120° in the presence of an organic nitrogen base.

BACKGROUND OF THE INVENTION

There are known methods for the preparation of 6β,5α-steroid chlorohydrins involving the use of 5α,6α-steroid epoxides as starting materials, wherein the epoxide group is split up by the action of hydrogen chloride. In one of these methods dilute aqueous hydrochloric acid or mixtures of hydrochloric acid and organic solvents, are used. Alternatively there can e.g. be used hydrochlorides of organic nitrogen bases, such as pyridine hydrochloride. Obtaining a pure 6β,5α-steroid chlorohydrin according to these methods is dependent upon the use of stereochemically unitary 5α,6α-steroid epoxides, which however are not easily available. The normal way of preparing such epoxides consists in epoxidizing a Δ$^5$-steroid with an organic peracid, such as peracetic acid, perbenzoic and or m-chloroperbenzoic acid, a mixture of the 5α,6α- and 5β,6β-steroid epoxide being formed. The separation of these isomers from this mixture e.g. by crystallization or chromatography is complicated and burdensome, especially on a technical scale, and in many cases it is not even possible to achieve a complete separation. Moreover the 5β,6β-epoxide so obtained cannot be used for further conversions, for instance into the above mentioned 6β,5α-steroid chlorohydrins. In order to obviate the loss of starting material in the form of the said 5β,6β-epoxide, a method has been devised to convert the said mixture of the isomeric epoxides into the unitary 5α,6α-epoxide by treating it with an oxygen containing mineral acid, selectively esterifying the 6-hydroxy group in the 5α,6β-dihydroxy steroid, e.g. by treatment with methane-sulfonyl chloride, and treating the ester obtained with a basic agent. This process is for instance described in U.S. Pat. 3,081,297.

SUMMARY OF THE INVENTION

The present invention proviides a method for converting 5α,6β-dihydroxy-steroids directly in a single step into 6β,5α-steroid chlorohydrins. As 5α,6β-dihydroxy-steroids are easily accessible, e.g. as described above, the present process for the preparation of 6β,5α-steroid chlorohydrins represents a considerable advance in the art.

The process of the invention consists in treating a 5α,6β-dihydroxy steroid with an aliphatic or aromatic sulfonic acid chloride in the presence of an organic nitrogen base which is inert towards the said sulfonic acid chloride, at a raised temperature.

As is known, the treatment of 5α,6β-dihydroxy steroids with the above mentioned sulfonic acid chlorides at temperatures below room temperature gives rise to the corresponding 6β-sulfonic acid esters. It is surprising that by raising the temperature the same reaction gives rise to the formation of 6β,5α-chlorohydrins.

DESCRIPTION OF THE PREFERRED EMBODIMENTS

The sulfonic acid chlorides to be used according to the process of the invention are e.g. aliphatic sulfonic acid chlorides whose aliphatic radical contains 1–8 C-atoms, such as methane-, ethane-, propane- or cyclohexane-sulfonic acid chloride, or mono or polycyclic aromatic sulfonic acid chlorides, such as benzene-, p-toluene or α- or β-naphthalene sulfonic acid chloride.

The sulfonic acid chloride is preferably used in excess over the molar quantity corresponding to the dihydroxysteroid used, preferably in a 1.1–5 mole equivalents per mol dihydroxysteroid.

The organic nitrogen base to be used can also serve as solvent. Any organic nitrogen base which does not react with the sulphonyl chlorides mentioned can be used. There are primarily used aliphatic open chained or cyclic tertiary amines, such as, for instance, trimethylamine, triethylamine, dimethylethylamine, dimethylpropylamine, N-alkyl substituted derivatives of piperidine or pyrrolidine, such as N-methyl or N-ethyl-piperidine or -pyrrolidine. There can also be used aromatic bases such as pyridine, quinoline or isoquinoline and their lower alkylated derivatives. Especially suitable is the use of pyridine.

The process according to the invention is carried out at raised temperature, preferably in the range between 30° and 120°, especially between 40° and 60°.

The conversion according to the process of the invention is generally accomplished within a period of one to 36 hours. The duration depends on various factors such as the temperature, the structure and the properties of the steroid starting materials, the nature of the sulfonic acid chlorides and the bases used.

αhe starting materials are 5α,6β-dihydroxy steroids, for instance of the cholestane-, spirostane-, androstane- and pregnane series, which may carry other substituents besides the said trans-diol grouping in 5,6-position. Some of these substituents may undergo other transformations under the conditions of the process of the invention. Thus, free primary or secondary hydroxy or amino groups may be converted into sulfonic acid esters or sulfonamido groups respectively. There are especially used 5α,6β-steroid diols of the said steroid series which have substituents inert to sulfonic acid chlorides.

Preferred starting steroids of the pergnane series are for instance those of the formula

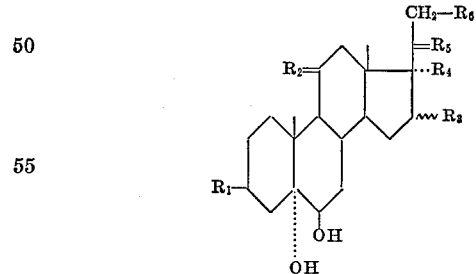

wherein $R_1$ represents an esterified or etherified hydroxy group, $R_2$ two hydrogen atoms, a hydroxy group in β-position together wth hydrogen or an oxo group, $R_3$ an α- or β-methyl group or an esterified or etherified hydroxyl group, $R_4$ a hydrogen atom or a free, an esterified or etherified hydroxyl group, $R_5$ an oxo group or an esterified or etherified hydroxy group together with hydrogen and $R_6$ hydrogen, fluorine or an esterified or etherified hydroxy group, and wherein $R_3$ taken together with $R_4$ may form a lower alkyliden-, aralkyliden- or cycloalkylidenedioxy grouping or $R_4$ together with $R_5$ and $R_5$ taken together with $R_6$ a lower alkylidendioxy group.

The said lower alkyl groups are preferably such with 1 to 4 carbon atoms, such as methyl, ethyl, propyl or butyl, the said lower alkylidene group is for instance one having up to 8 carbon atoms, such as an isopropylidene, a diethylmethylene, a methyl-ethyl-methylene group, an aralalkylidene group is for instance a methyl-phenyl or an ethyl-phenyl-methylene group and a lower cycloalkylidene group is above all one derived from a cycloaliphatic hydrocarbon with 5–7 ring carbon atoms, such as a cyclopentylidene or cyclohexylidene group.

The above mentioned esterified hydroxyl groups are primarily derived from organic acids of the aliphatic, alicyclic, aromatic or heterocyclic series, especially those which contain 1 to 18 carbon atoms, for example formic, acetic, propionic, acid, butyric acids, valeric acids such as n-valeric acid, or trimethylacetic or trifluoroacetic acid, a caproic acid such as $\beta$-trimethylpropionic acid or diethylacetic acid, oenanthic, caprylic, pelargonic, capric, an undecylic acid, for example undecylenic acid, lauric, myristic, palmitic or stearic acids, for example oleic, cyclopropane-, cyclobutane-, cyclopentane- or cyclohexane-carboxylic acid, cyclopropylmethanecarboxylic, cyclobutylmethanecarboxylic, cyclopentylethanecarboxylic, cyclohexylethanecarboxylic, a cyclopentyl-, cyclohexyl- or phenyl-acetic or propionic acid, benzoic, phenoxyalkanoic acids such as phenoxyacetic, dicarboxylic acids such as succinic, phthalic, quinolic acid, furan-2-carboxylic, 5-tertiary butyl - furan - 2 - carboxylic, 5-bromo-furan-2-carboxylic acid, nicotinic or isonicotinic acid, or sulphonic acids such as benzenesulphonic acids or inorganic acids, for example phosphoric or sulphuric acids.

The ester groups may alternatively be derived from orthocarboxylic acids such as orthoformic, orthoacetic or orthopropionic acid, and these acids, as well as the above-mentioned dicarboxylic acids, may furnish cyclic 17,21-esters.

As etherified hydroxyl groups there may be specially mentioned those derived from alcohols with 1 to 8 carbon atoms, such as lower aliphatic alkanols, ethanol, methanol, propanol, isopropanol, the butyl or amyl alcohols, or from araliphatic alcohols, especially from monocyclic aryl-lower aliphatic alcohols, such as benzyl alcohol, or from heterocyclic alcohols, such as $\alpha$-tetrahydropyranol or -furanol.

The $5\alpha,6\beta$-dihydroxy steroids to be used as starting materials are preferably those having the following partial formula of rings A and B

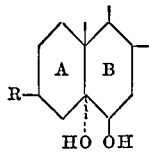

wherein R is an esterified or etherified hydroxy group.

Especially important $5\alpha,6\beta$-steroid diols to be used according to the process of the present invention are:

$3\beta$-acetoxy-$5\alpha,6\beta$-dihydroxy-pregnane-20-one,
$3\beta$-acetoxy-$5\alpha,6\beta,17\alpha$-trihydroxy-pregnane-20-one,
$3\beta$-acetoxy-$4\alpha,6\beta,17\alpha$-trihydroxy-$16\alpha$-methyl-pregnane-20-one,
$3\beta,21$-diacetoxy-$5\alpha,6\beta,17\alpha$-trihydroxy-pregnane-20-one,
$3\beta$-acetoxy-$5\alpha,6\beta$-dihydroxy-androstan -17-one,
$3\beta,17\beta$-diacetoxy-$5\alpha,6\beta$-dihydroxy-androstane,
$3\beta$-acetoxy-$5\alpha,6\beta$-dihydroxy-chloroestane,
$3\beta$-acetoxy-$5\alpha,6\beta$-dihydroxy-spirostane,
$3\beta,20\alpha$-diacetoxy-$5\alpha,6\beta$-dihydroxy pregnane,
$3\beta,20\beta$-diacetoxy-$5\alpha,6\beta$-dihydroxy-pregnane,
$3\beta$-acetoxy-$5\alpha,6\beta$-dihydroxy-$16\alpha,17\alpha$-isopropylidendioxy-pregnane-20-one,
$3\beta$-acetoxy-$5\alpha,6\beta$-dihydroxy-$17\alpha,20;20,21$-bismethylene-dioxy-pregnane,
$3\beta$-acetoxy-$5\alpha,6\beta$-dihydroxy-$16\alpha$-methyl-17a, 20;20,21-bismethylenedioxy-pregnane and
$3\beta,21$-diacetoxy-$5\alpha,6\beta$-dihydroxy-$16\alpha,17\alpha$-isopropylidendioxy-pregnane-20-one.

The starting compounds for the process of this invention are mostly known or they can be manufactured in an a manner known per se.

The $6\alpha,5\beta$-steroid chlorohydrins to be prepared according to the present invention are also mostly known compounds. They represent important starting materials for the manufacture of compounds with pharmacological action, such as $6\alpha$-chloroprogesterone derivatives, for instance those having $17\alpha$-hydroxy or acyloxy group and/or a $16\alpha$-methyl group, such as, for instance, chlormadinone acetate. Among the corticoids substituted in 6-position by a chlorine atom that are particularly to be mentioned those having a $16\alpha$- or $16\beta$-methyl group and double bond in 1,2- and 6,7-positions and/or a fluorine atom in $9\alpha$-position. The conversion of the halohydrins resulting from the process of the present invention into the said pharmacologically important steroids can be effected in a manner known per se., for instance by saponification of any ester group in 3-position, dehydrogenation of the 3-hydroxy group to the 3-oxo group, splitting off of water with formation of the 4,5-double bond, isomerization in 6-position to form the $6\alpha$-chloro derivative and introduction, if desired, of the other substituents mentioned, such as the 1,2-double bond or a $9\alpha$-fluorine atom.

The invention is illustrated by the following examples. The temperatures are given in degrees centigrade.

EXAMPLE 1

10 g. $3\beta$ - acetoxy-$5\alpha,6\beta,17\alpha$-trihydroxy-$16\alpha$-methyl-pregnane-20-one are dissolved in 20 ml. of pyridine and there are added 10 g. of p-toluene sulphonic acid chloride. The reaction mixture is stirred at 50° for 16 hours. The dark reaction solution is then slowly poured while stirring on 200 ml. of a mixture of 9 parts by weight of water and 1 part by weight of concentrated hydrochloric acid. The suspension thus formed is stirred on for half an hour and then filtered. The filter residue is well washed with hot water and dried. It consists of $3\beta$-acetoxy-$5\alpha,17\alpha$-dihydroxy-$6\beta$-chloro-$16\alpha$ - methyl-pregnane-20-one melting at 185/190–193°.

EXAMPLE 2

5 g. of $3\beta,5\alpha,6\beta$ - androstantriol-17-one-3-acetate are dissolved in 10 ml. of pyridine and there are added 5 g. of p-toluenesulfonyl chloride. The reaction mixture is stirred at 80° for 4 hours. The mixture is poured into 100 ml. water and the oily solid is extracted with 100 ml. of methylene chloride. The methylene chloride phase is washed with dilute hydrochloric acid and water to pH 7 and then evaporated in vacuo to a solid residue. Crystallization thereof from acetone gives $6\beta$-chloro-$3\beta,5\alpha$-androstandiol-17-one 3-acetate with a M.P. 202–05° C.

What is claimed is:

1. Process for the manufacture of $6\beta,5\alpha$-steroid chlorohydrins, wherein one mol equivalent of $5\alpha,6b$-dihydroxy-steroid of the partial formula of rings A and B

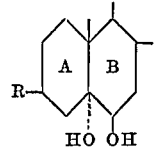

wherein R is an esterified or etherified hydroxy group, is treated with a quantity of 1.1 to 5 mol equivalents of a saturated open chained or cyclic aliphatic sulfonic acid chloride with up to 8 carbon atoms or a monocyclic, carbocyclic aromatic sulfonic acid chloride at a temperature interval of 30 to 120° in the presence of an organic nitrogen base selected from the group consisting of a saturated aliphatic open-chained or cyclic tertiary amine with 3 to 7 carbon atoms, unsubstituted pyridine, quinoline or isoquinoline and their lower alkylated derivatives, which base is inert towards the said sulfonic acid chlorides and serves as solvent of said 5α,6β-dihydroxy-steroid.

2. Process as claimed in claim 1, wherein there is used p-toluene-sulfonic acid chloride.

3. Process as claimed in claim 1 wherein there is used pyridine as base.

4. Process as claimed in claim 1, wherein the reaction is carried out in the temperature interval of 40–60°.

5. Process a claimed in claim 1, wherein a steroid of the androstane, pregnane, cholestane or spirostane series is used as starting material.

6. Process as claimed in claim 1, wherein there is used a steroid of the formula

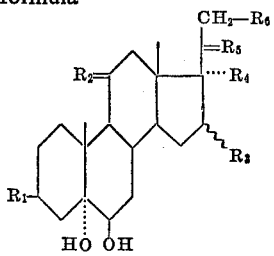

wherein $R_1$ represents an esterified or etherified hydroxy group, $R_2$ two hydrogen atoms, a hydroxy group in β-position together with hydrogen or an oxo group, $R_3$ an α or β-methyl group or an esterified or etherified hydroxyl group, $R_4$ a hydrogen atom or a free, an esterified or etherified hydroxyl group, $R_5$ an oxo group or an esterified or etherified hydroxy group together with hydrogen and $R_6$ hydrogen, fluorine or an esterified or etherified hydroxy group, and wherein $R_3$ taken together with $R_4$ also forms a lower alkyliden-, aralkylidene- or cycloalkylidenedioxy grouping, or $R_4$ together with $R_5$ and $R_5$ taken together with $R_6$ are a lower alkylidendioxy group, in which steroid any lower alkyl group has 1 to 4 carbon atoms, any lower alkylidene group has up to 8 carbon atoms, any aralkylidene group is selected from the group consisting of methylphenyl- and ethylphenyl-methylene, any lower cycloalkylidene group is derived from a cycloaliphatic hydrocarbon with 5–7 ring carbon atoms, any esterified hydroxyl group is derived from a carboxylic acid having from 1 to 18 carbon atoms, and any etherified hydroxyl group is derived from an alcohol having from 1 to 8 carbon atoms.

7. Process as claimed in claim 1, wherein the 5α,6β-dihydroxy steroid is selected from the group consisting of
3β-acetoxy-5α,6β-dihydroxy-pregnane-20-one,
3β-acetoxy-5α,6β,17α-trihydroxy-pregnane-20-one,
3β-acetoxy-5α,6β,17α-trihydroxy-16α-methyl-pregnane-20-one,
3β,21-diacetoxy-5α,6β-17α-trihydroxy-pregnane-20-one,
3β-acetoxy-5α,6β-dihydroxy-androstan-17-one,
3β,17β-diacetoxy-5α,6β-dihydroxy-androstane,
3β-acetoxy-5α,6β dihydroxy-cholestane,
3β-acetoxy-5α,6β-dihydroxy-spirostane,
3β,20α-diacetoxy-5α,6β-dihydroxy-pregnane,
3β,20β-diacetoxy-5α,6β-dihydroxy-pregnane,
3β-acetoxy 5α,6β-dihydroxy-16α,17α-isopropylidendioxy-pregnane-20-one,
3β-acetoxy-5α,6β-dihydroxy-17α,20;20,21-bismethylenedioxy-pregnane,
3β-acetoxy-5α,6β-dihydroxy-16α-methyl-17α,20;20,21-bismethylenedioxy-pregnane, and
3β,21 diacetoxy-5α,6β-dihydroxy-16α,17α-isopropylidendioxy-pregnane-20-one.

References Cited

UNITED STATES PATENTS

| | | | |
|---|---|---|---|
| 3,081,297 | 3/1963 | Wettstein et al. | 260—239.55 |
| 3,364,241 | 1/1968 | Pike et al. | 260—397.45 |

HENRY A. FRENCH, Primary Examiner

U.S. Cl. X.R.

260—239.55 D, 397.2, 397.4, 397.45, 397.47, 397.5